(12) United States Patent
Leizerovich et al.

(10) Patent No.: US 11,844,151 B2
(45) Date of Patent: Dec. 12, 2023

(54) SMALL CELL ACCESS NODE

(71) Applicant: Ubicquia, Inc., Fort Lauderdale, FL (US)

(72) Inventors: Gustavo Dario Leizerovich, Aventura, FL (US); Claudio Santiago Ribeiro, Evanston, IL (US); Cesar Eduardo Nunez, Miramar, FL (US)

(73) Assignee: Ubicquia, Inc., Fort Lauderdale, FL (US)

( * ) Notice: Subject to any disclaimer, the term of this patent is extended or adjusted under 35 U.S.C. 154(b) by 209 days.

(21) Appl. No.: 17/567,116

(22) Filed: Jan. 1, 2022

(65) Prior Publication Data

US 2023/0232496 A1 Jul. 20, 2023

(51) Int. Cl.
*H04W 88/08* (2009.01)

(52) U.S. Cl.
CPC .................... *H04W 88/08* (2013.01)

(58) Field of Classification Search
CPC ............................. H04W 88/08; H04B 1/3888
USPC ......................................... 455/456.2
See application file for complete search history.

(56) References Cited

U.S. PATENT DOCUMENTS

| | | | |
|---|---|---|---|
| 9,192,079 B2 | 11/2015 | Loth | |
| 11,653,436 B2 * | 5/2023 | Vendetti | F21V 23/06 315/307 |
| 2018/0027359 A1 | 1/2018 | Gonzalez et al. | |
| 2018/0045388 A1 | 2/2018 | McDowell et al. | |
| 2019/0341732 A1 | 11/2019 | Zimmerman, III et al. | |
| 2020/0080695 A1 | 3/2020 | Lalos et al. | |
| 2020/0195304 A1* | 6/2020 | Vannucci | H01P 7/06 |
| 2020/0359462 A1 | 11/2020 | Zimmerman, III et al. | |
| 2020/0373682 A1 | 11/2020 | Root et al. | |

(Continued)

FOREIGN PATENT DOCUMENTS

CN 211702797 U 10/2020

OTHER PUBLICATIONS

U.S. Patent & Trademark Office as International Searching Authority, International Search Report issued in connection with counterpart International Application No. PCT/US22/54121, dated Apr. 18, 2023, 2 pages.

(Continued)

*Primary Examiner* — Huy C Ho
(74) *Attorney, Agent, or Firm* — Daniel C. Crilly; Scott M. Garrett (57) ABSTRACT

A small cell access node is configured for mounting in an elevated or aerial location, such as on a streetlight. In one exemplary embodiment, the small cell access node includes a housing, at least one electrical module, and an electrical interface connector. The housing includes an electrically conductive lower housing member having a floor portion and an electrically non-conductive sidewall housing member secured along a first edge thereof around at least part of a periphery of the floor portion. The at least one electrical module is positioned in a volume defined by at least the lower housing member and the sidewall housing member. The at least one electrical module includes a shielded enclosure, which is electrically coupled to the lower housing member. The electrical interface connector passes through the lower housing member and supplies electrical power received from an external power source to the at least one electrical module.

20 Claims, 10 Drawing Sheets

(56) References Cited

U.S. PATENT DOCUMENTS

2021/0167811 A1\* 6/2021 Henry ...................... H04B 3/46
2021/0305689 A1 9/2021 Lelzerovich

OTHER PUBLICATIONS

U.S. Patent & Trademark Office as International Searching Authority, Written Opinion of the International Searching Authority in connection with counterpart International Application No. PCT/US22/54121, dated Apr. 18, 2023, 6 pages.

\* cited by examiner

SMALL CELL ACCESS NODE

TECHNICAL FIELD

The present disclosure relates generally to telecommunication equipment for facilitating wireless communication, and, more particularly, relates to a small cell access node housing that minimizes weight while providing sufficient strength for mounting the housing in elevated locations.

BACKGROUND

Mobile wireless communication systems are in widespread use, and demand for mobile communication resources is increasing. Mobile communications relies on a cellular arrangement where a base station or other fixed equipment acts as an interface between a subscriber device (e.g., cellular telephone device) and a telephony and data network for a given region. Each region in which a base station provides communication resources is a cell. As a user moves from cell to cell the user's communication is handed off from one cell to the next.

Given the increasing demand for communication resources, and given that radio spectrum is limited, one way to increase resources is to reduce the size of cells so that there are more cells over a given geographic area. As a result, service providers are moving away from large, tower-based stations to smaller access points that can be placed in more common locations, such as on streetlight masts in urban regions. Taking advantage of these existing structures that were not necessarily designed with the intent of hosting mobile communications equipment requires minimizing the size and weight of such equipment.

SUMMARY

According to one exemplary embodiment of the present disclosure, a small cell access node includes a housing, at least one electrical module, and an electrical interface connector. The housing includes an electrically conductive lower housing member having a floor portion and an electrically non-conductive or electrically insulative sidewall housing member secured along a first edge thereof around at least part of a periphery of the floor portion. The at least one electrical module is positioned in a volume defined by at least the lower housing member and the sidewall housing member. The at least one electrical module includes a shielded enclosure, which is electrically coupled to the lower housing member. The electrical interface connector passes through the lower housing member and supplies electrical power received from an external power source to the at least one electrical module. According to one embodiment, the volume defined by at least the lower housing member and the sidewall housing member is in a range of about 5000 cubic centimeters to about 9000 cubic centimeters. According to another embodiment, the lower housing member and the shielded enclosure of the at least electrical module are electrically grounded. Such grounding may be direct or capacitive.

According to an alternative embodiment of the present disclosure, the small cell access node also includes an electrically non-conductive cover secured to the sidewall housing member along a second edge thereof. For example, a lower edge of the sidewall housing member may be secured to the lower housing member around at least part of a periphery of the floor portion of the lower housing member and the cover may be secured along an upper edge of the sidewall housing member. In some embodiments, the cover may have an access door, which may be a sliding door and located proximate a lengthwise end of the cover.

According to another alternative embodiment of the present disclosure, the small cell access node may further include a second electrical interface connector passing through the cover. In such a case, the second electrical interface connector may be operable to supply electrical power received from the external power source to an external device electrically connected to the second electrical connector.

According to a further alternative embodiment of the present disclosure, the at least one electrical module of the small cell access node may include a radio module positioned over a first section or portion of the floor portion of the lower housing member, a power supply module, and a control module. In such an embodiment, the control module and the power supply module may be configured in a stacked arrangement and positioned over a second section or portion of the floor portion of the lower housing member.

According to yet another alternative embodiment of the present disclosure, the small cell access node may include at least one antenna mounted between the sidewall housing member and the at least one electrical module, wherein a transceiver of the radio module is electrically coupled to the at least one antenna. In such a case, the at least one antenna may include a first antenna positioned on a first side of the at least one electrical module and a second antenna positioned on a second side of the at least one electrical module, where the second side of the at least one electrical module is opposite the first side of the at least one electrical module.

According to another alternative embodiment of the present disclosure, a small cell access node includes an electrically conductive lower housing member, an electrically non-conductive, generally U-shaped sidewall housing member, at least one electrical module, and an electrically non-conductive cover. The lower housing member includes a floor portion and a sidewall portion, where the sidewall portion is connected to the floor portion at one lengthwise end of the floor portion. The sidewall housing member is secured to the floor portion and the sidewall portion of the lower housing member. The at least one electrical module is positioned over the floor portion of the lower housing member. Additionally, the at least one electrical module is housed in at least one shielded enclosure that is electrically coupled to the floor portion of the lower housing member. Such electrical coupling may be direct or capacitive. The cover is secured to the sidewall housing member and the sidewall portion of the lower housing member.

According to another alternative embodiment of the present disclosure, the small cell access node also includes an electrical interface connector passing through the lower housing member. In such a case, the electrical interface connector is operable to receive electrical power from an external power source and provide the electrical power to the at least one electrical module.

According to a further alternative embodiment of the present disclosure, the at least one electrical module of the small cell access node includes a radio module, a power supply module, a control module, and a shielded power cable connecting the power supply module to the radio module. According to this embodiment, the radio module is housed in a first shielded enclosure of the at least one shielded enclosure and positioned over a first section of the floor portion of the lower housing member. The control module and the power supply module may be configured in a stacked arrangement and positioned over a second section of the floor portion of the lower housing member. In such a case, the stacked arrangement of the power supply module and the control module may be housed in a second, shared shielded enclosure of the at least one shielded enclosure. Additionally, the shielding of the shielded power cable is electrically connected to the first shielded enclosure and/or the second shielded enclosure.

According to yet another alternative embodiment of the present disclosure, the small cell access node further includes at least two antenna elements separately coupled to the radio module. The at least two antenna elements include a first antenna element positioned on a first side of the radio module between the radio module and the sidewall housing member, and a second antenna element positioned on a second side of the radio module between the radio module and the sidewall housing member. The second side of the radio module is opposite the first side of the radio module.

According to another alternative embodiment of the present disclosure, the at least one electrical module of the small cell access node is coupled directly to the floor portion of the lower housing member at a plurality of interface points. In such a case, each interface point of the plurality of interface points may be or constitute a zero ohm, direct current coupling.

According to another alternative embodiment of the present disclosure, a small cell access node includes an electrically conductive lower housing member, an electrically non-conductive, generally U-shaped sidewall housing member, at least one electrical module, at least one antenna, and an electrically non-conductive cover. According to this embodiment, the lower housing member includes a floor portion and a sidewall portion, where the sidewall portion is connected to the floor portion at one lengthwise end of the floor portion. The sidewall housing member is secured to the floor portion and the sidewall portion of the lower housing member. The sidewall housing member and the lower housing member at least partially define a volume. The at least one electrical module is positioned within the volume and over the floor portion of the lower housing member. Additionally, the at least one electrical module is housed in at least one shielded enclosure that is electrically coupled to the floor portion of the lower housing member. Such electrical coupling may be direct or capacitive. The at least one antenna is mounted within the volume and coupled to the at least one electrical module via an antenna cable. The cover is secured to the sidewall housing member and the sidewall portion of the lower housing member.

According to another alternative embodiment of the present disclosure, the small cell access node further includes an electrical interface connector passing through the lower housing member. In this case, the electrical interface connector is operable to receive electrical power from an external power source and provide the electrical power to the at least one electrical module.

According to a further alternative embodiment of the present disclosure, the at least one electrical module of the small cell access node includes a radio module, a power supply module, a control module, and a shielded power cable connecting the power supply module to the radio module. According to this embodiment, the radio module is housed in a first shielded enclosure of the at least one shielded enclosure and positioned over a first section of the floor portion of the lower housing member. The control module and the power supply module may be configured in a stacked arrangement and positioned over a second section of the floor portion of the lower housing member. In such a case, the stacked arrangement of the power supply module and the control module may be housed in a second, shared shielded enclosure of the at least one shielded enclosure. Additionally, the shielding of the shielded power cable is electrically connected to the first shielded enclosure and/or the second shielded enclosure.

According to yet another alternative embodiment of the present disclosure, the small cell access node further includes at least two antenna elements separately coupled to the radio module. The at least two antenna elements include a first antenna element positioned on a first side of the radio module between the radio module and the sidewall housing member, and a second antenna element positioned on a second side of the radio module between the radio module and the sidewall housing member. The second side of the radio module is opposite the first side of the radio module.

According to another alternative embodiment of the present disclosure, the at least one electrical module of the small cell access node is coupled directly to the floor portion of the lower housing member at a plurality of interface points. In such a case, each interface point of the plurality of interface points may be or constitute a zero ohm, direct current coupling.

Although the present disclosure illustrates and describes a small cell access node, it is, nevertheless, not intended to be limited to the details shown because various modifications and structural changes may be made therein without departing from the spirit of the disclosure and while remaining within the scope and range of equivalents of the claims. Additionally, well-known elements of the small cell will not be described in detail or will be omitted so as not to obscure the relevant details of the invention.

Features that are considered characteristic of the invention are set forth in the appended claims. As required, detailed embodiments of the small cell access node are disclosed herein; however, it is to be understood that the disclosed embodiments are merely exemplary, and the small cell may be embodied in various forms. Therefore, specific structural and functional details disclosed herein are not to be interpreted as limiting, but merely as a basis for the claims and as a representative basis for teaching one of ordinary skill in the art to variously employ the claimed invention in appropriately detailed structures. Further, the terms and phrases used herein are not intended to be limiting; but rather, to provide an understandable description of the disclosure. While the specification concludes with claims defining the features of the invention, it is believed that the claimed invention will be better understood from a consideration of the following description in conjunction with the drawing figures, in which like reference numerals are carried forward. The figures of the drawings are not drawn to scale.

The terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used in this description and the appended claims, the term "small cell" or "small cell access node" refers to a low-powered radio access node or device that operates in licensed or unlicensed spectrum having a range of ten meters to a few kilometers and which may help provide wireless communication service to indoor and/or outdoor areas. Small cells or small cell access nodes may be femtocells, picocells, or microcells.

As used in this description, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes and cannot be construed as indicating or implying relative importance.

As used in this description, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). If not otherwise stated, it can be assumed that a given dimension or range can have a tolerance of ±50%. In many instances these terms may include numbers that are rounded to the nearest significant figure. In this document, the term "longitudinal" should be understood to mean in a direction corresponding to an elongated direction of the device. Those skilled in the art can understand the specific meanings of the above-mentioned terms in the embodiments of the present disclosure according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present disclosure.

DETAILED DESCRIPTION

Figure 1:
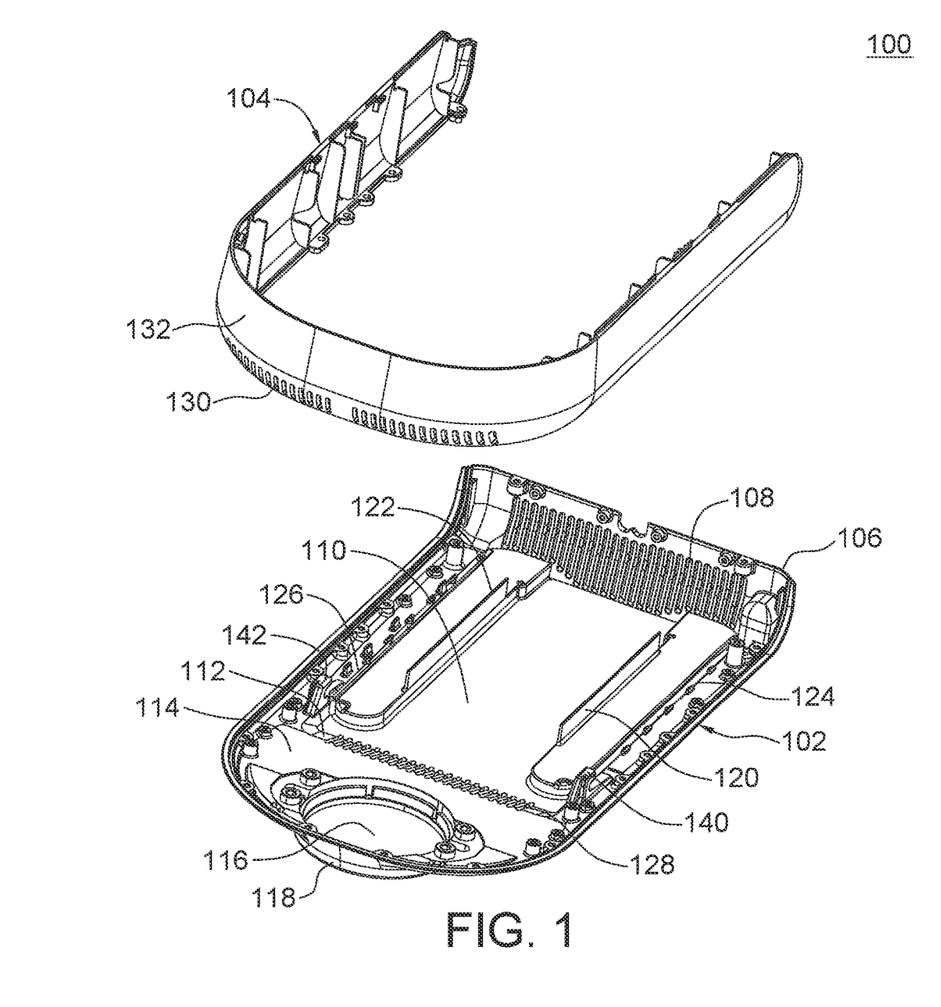
FIG. 1 shows a perspective exploded view of a small cell access node for housing the electrical and electronic components of the small cell access node, in accordance with some embodiments of the present disclosure.

FIG. 1 shows a perspective exploded view of a partial housing assembly 100 for an apparatus or device such as, for example, a small cell access node, for housing the electrical and electronic components of the device, in accordance with some embodiments of the present disclosure. A small cell access node is a telecommunications device that facilitates, among other things, communication between mobile devices and a telecommunications infrastructure. The subsequent drawings also show the housing assembly in various states and from various views, so like reference numerals are used throughout the drawings. Accordingly, reference can be made to any or all of the drawings in the following description.

In general, the housing assembly is arranged to house one or more electrical module that can include a power supply, radio circuitry, control circuitry, and peripheral circuitry. The device accomplishes this by drawing air in (cool air) at one end of an of the device, routing the intake air through one or more air flow channels under the electric module(s), and utilizing two separate exhaust ports for exhausting heated air out of the device at the end of the device opposite the intake. The exhaust ports are arranged in stages such a one exhaust port is located between the end of the device, at a bottom of the housing, and a second exhaust port is located at the opposite end of the device from the intake port.

As shown in the drawings, and referring to FIG. 1, there is shown a lower housing member 102 and a sidewall housing member 104. These members 102, 104 form a housing having a floor portion and a sidewall portion. The lower housing member 102 defines a floor and includes a back wall 106 that has an air intake section including an intake port 108 formed in the back wall 106. The back wall 106 can be considered a sidewall portion and is located at a first lengthwise end of the lower housing member 102 and has a width, in the horizontal direction, that is approximately equal to a width of the first floor portion 110 in a direction perpendicular to the lengthwise direction. The intake port 108 is comprised or one or more openings or air intake apertures through which air can be pulled into the housing from the outside, and into the device. The openings can be holes, slits, or any other shape, sized to prevent ingress of foreign matter. Alternatively, the opening(s) can be covered with a screen or mesh to keep out foreign matter. The lower housing member 102 is made of an electrically conductive material, such as aluminum, or a lightweight alloy, in order to provide sufficient rigidity and structure support of the components housed in the housing assembly. Further, making the lower housing member 102 of a metal provides a grounding plane for electrical and electronic components housed in the housing assembly.

The floor of the lower housing member 102 can include the first floor portion 110, which is a generally flat surface that is oriented horizontally when the device is horizontally oriented. The first floor portion extends substantially from the back wall 106 forward to the lower end 140 of a transition portion 112. The second floor portion 114 extends from the upper end 142 of the transition portion 112 forward to the second lengthwise end 144 of the lower housing member 102. The transition portion 112 is between the first floor portion 110 and a second floor portion 114, that is also generally flat, defining a plane that is parallel, but not coplanar with a plane of the first floor portion 110. That is, the first floor portion 110 and the second floor portion 114 are at different levels, and the transition portion 112 joins the two floor portions 110, 114. In some embodiments the transition portion 112 can be an angle less than ninety degrees relative to the two floor portions 110, 114, and in some embodiments the transition portion 112 can be at an angle of five to forty-five degrees relative to the floor portions 110, 114, or alternatively, to the horizontal direction when the device is properly mounted and leveled. The transition portion 112 include a first exhaust port 128 that, like the intake port 108, is formed of a plurality of air exhaust apertures through which air can escape. In some embodiments the openings can be a series of longitudinal slits oriented in the lengthwise direction of the lower housing member 102. In some embodiments at least some of the openings in the first exhaust port 128 extend to the first floor portion 110 to facilitate water drainage out of the housing assembly 100 in the event of water ingress into the housing assembly 100. In some embodiments the first floor portion 110 and the second floor portion 114 can be slightly angled in order to direct any water that enters the device to flow across the floor portions 110, 114 towards the first exit port 128 to drain out of the device.

The second floor portion 114 can include an opening 116 that is sized to house a vertically oriented electrical connector (not shown here), such as an electrical connector (e.g., 138) configured to connect to an outdoor lighting fixture (e.g., a streetlight fixture). The electrical connector can be configured to connect to a lighting utility, such as a streetlight, as defined, for example, by the National Electrical Manufacturers Association (NEMA). Specifically, the connector can be a three conductor twist locking type. A boss 118 extends downward from the bottom of the lower housing member 102 around the opening 116 to support the electrical connector. The electrical connector can include a housing that fits within the opening 116 that seals the opening to weather.

The first floor portion 110 can include one or more medial walls, such as, for example, walls 120, 122. The walls 120, 122 run in the lengthwise direction of the lower housing member 102 from the back wall 106 towards the opposite end. The walls 120, 122 are raised portions that, when other components of the device are placed into the housing assembly 100, form air flow channels. For example, the walls 120, 122 can be spaced a distance from the sidewall to define air flow channels 124, 126 between the walls 120, 122, and the sidewall. The main or central air flow channel between the walls 120, 122 can be used to cool a heat-generating electrical module positioned over, but spaced apart from the first floor portion 110, with the heated air primarily exiting through the first exhaust portion 128. Side flow air channels 124, 126 can be used to route cool air around the space between walls 120, 122 to the front of the housing assembly, and to the second floor portion 114 where it can cool another heat-generating electrical module, with the air being exhausted through the second exhaust port 130 at the front 132 of the sidewall housing member 104.

The sidewall housing member 104 as shown here is a U-shaped member that, along with back wall 106 provides the vertical sidewall of the housing from the lower housing member 102, and which, along with the other housing members, defines a volume inside the device that can be on the order of 7,085 cubic centimeters. The sidewall housing member 104 connects to the lower housing member 102 around a periphery of the lower housing member 102 and abuts the back wall 106 of the lower housing member 102 at opposite ends of the back wall 106. The back wall 106, in some embodiments, can rise up a portion of the sidewall housing member 104. The sidewall housing member 104 has a front 132 that is positioned opposite the back wall 106 of the lower housing member 102. A second exhaust port 130 is formed at the front 132 of the sidewall housing member 104. The second exhaust port 130 comprises one or more openings or air exhaust apertures through the sidewall member that allows air inside the sidewall housing member 104 to pass through the sidewall housing member 104. The overall height of assembled housing can be on the order of 30-150 millimeters.

Figure 2:
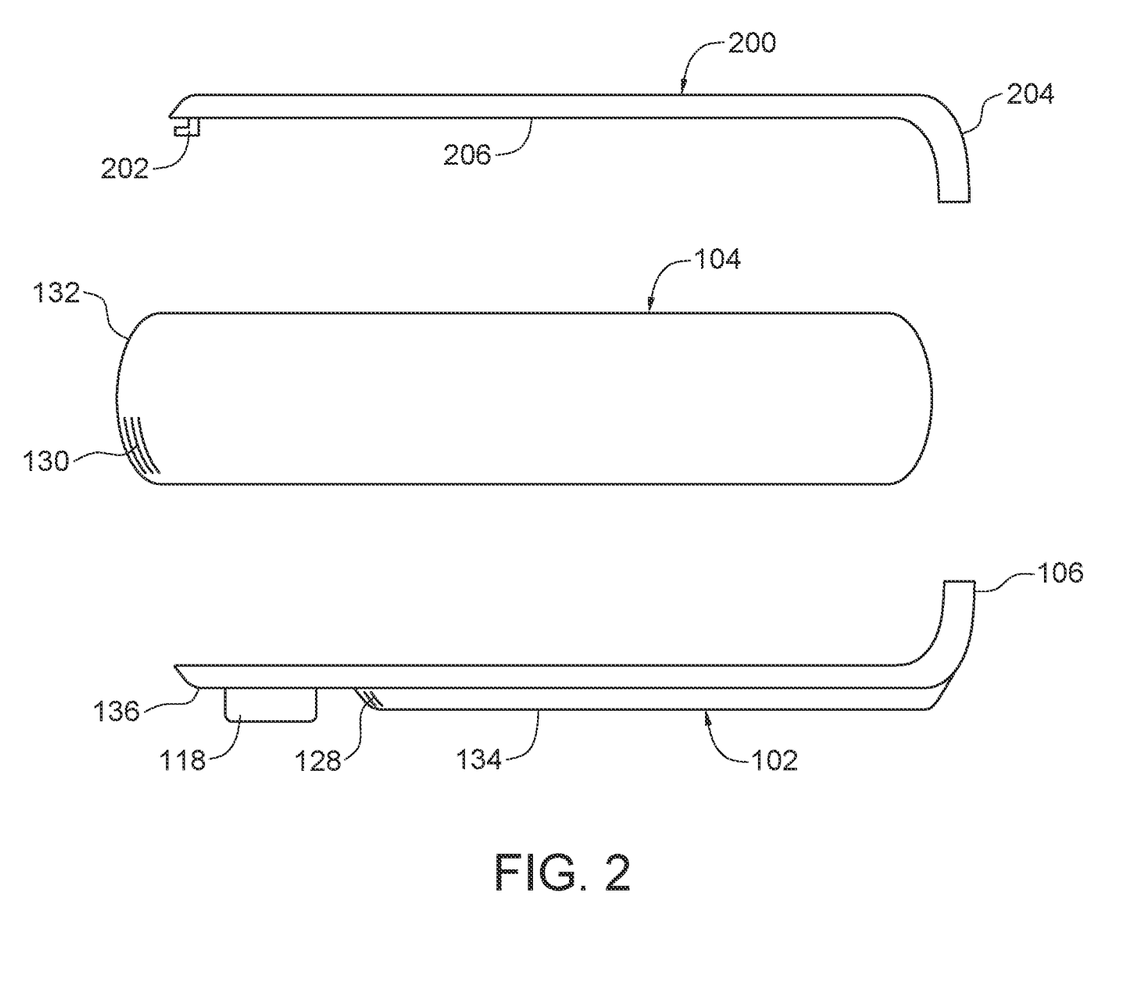
FIG. 2 shows a side elevational exploded view of a small cell access node, in accordance with some embodiments of the present disclosure.

FIG. 2 shows a side elevational exploded view of a housing assembly for a small cell access node, in accordance with some embodiments. In addition to the lower housing member 102, and the sidewall housing member 104, there is shown a cover housing member 200 that engages the top of the sidewall housing member 104. The cover housing member 200 can slide into engagement using a front catch feature 202. The cover housing member 200 also have a back wall portion 204 that can complement and align with the back wall 106 of the lower housing member 102 when the housing members 102, 104, 200 are assembled together to provide a complete cover of the back/rear of the housing assembly. The lower side edges 206 of the cover housing member 200 can have features to engage corresponding slide rail/track retention features in the sidewall housing member 104 on the inside top edge of the sidewall housing member 104. In this view, the underside 134 of the first floor portion 110 can be seen on the exterior bottom surface of the lower housing member 102. Likewise, the underside 136 of the second floor portion 114 can be seen adjacent the boss 118. The sidewall housing member 104 and the cover 200 are made of a dielectric material, such as plastic, which can include, for example, polyvinyl chloride (PVC), to allow electromagnetic signals to pass through the sidewall housing member 104 and cover 200 as well as to reduce the weight of the small cell device.

Figure 3:
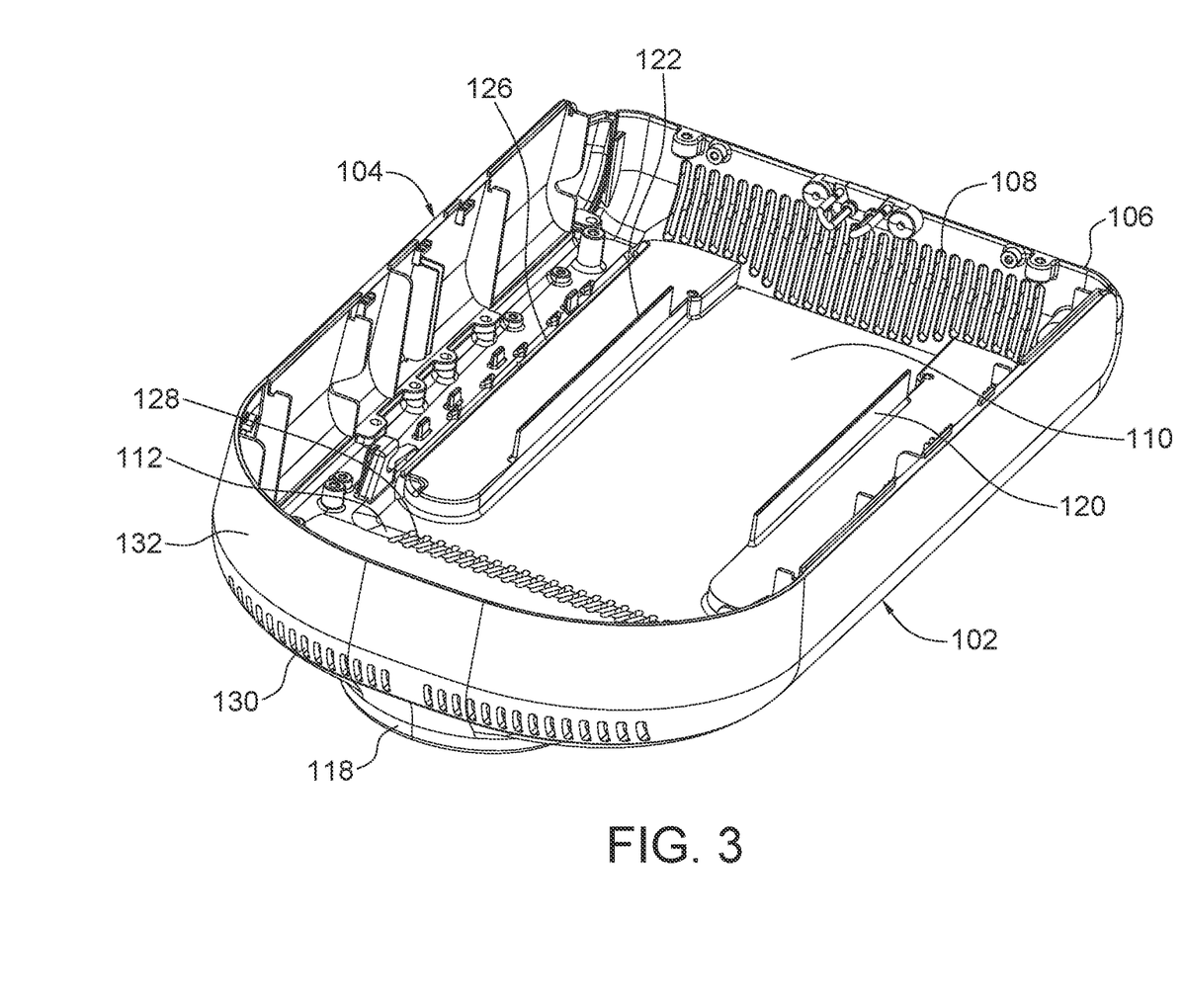
FIG. 3 shows a front perspective view partially assembled housing system for a small cell access node, in accordance with some embodiments of the present disclosure.
Figure 4:
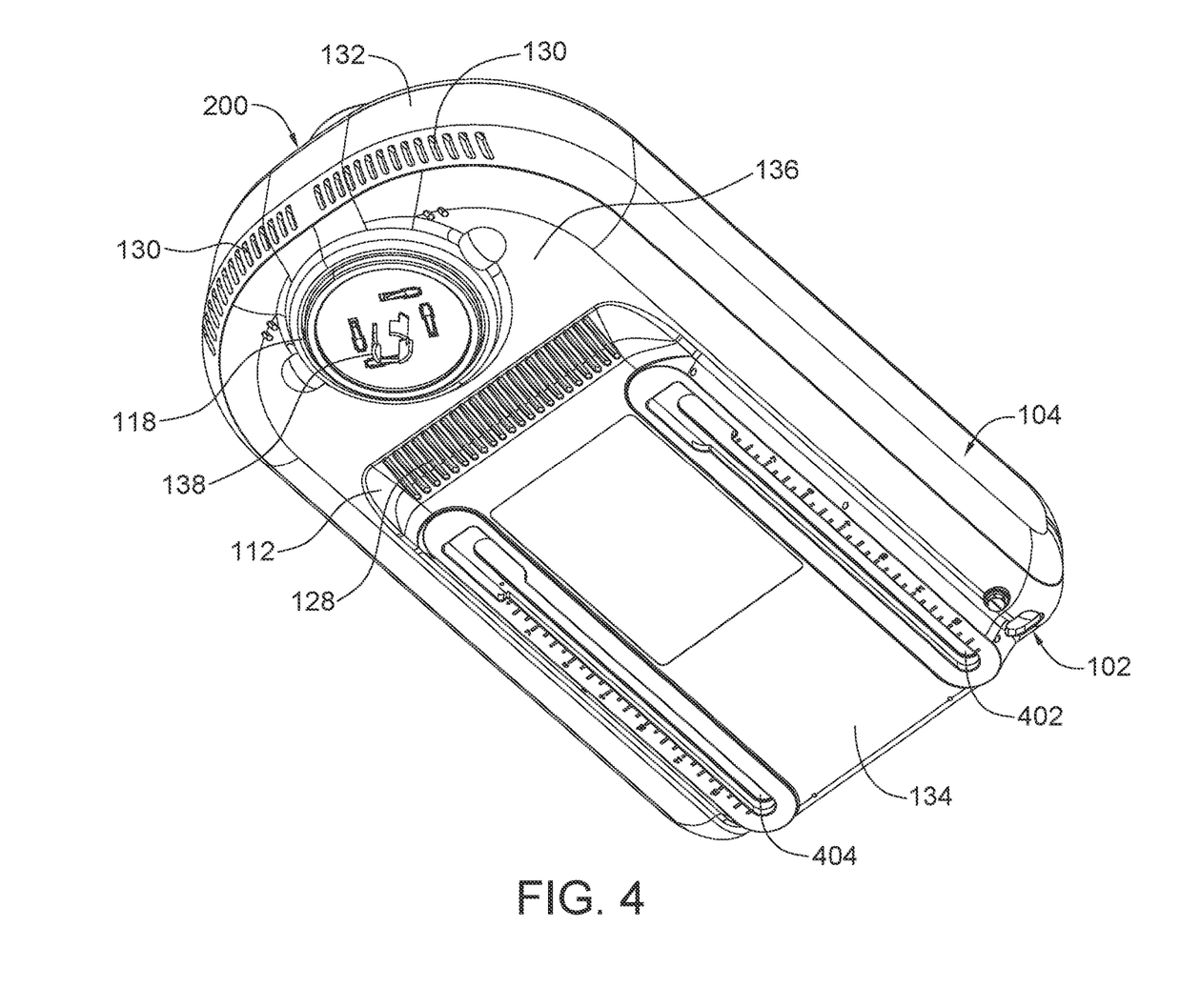
FIG. 4 shows a bottom perspective unassembled small cell access node, in accordance with some embodiments of the present disclosure.
Figure 5:
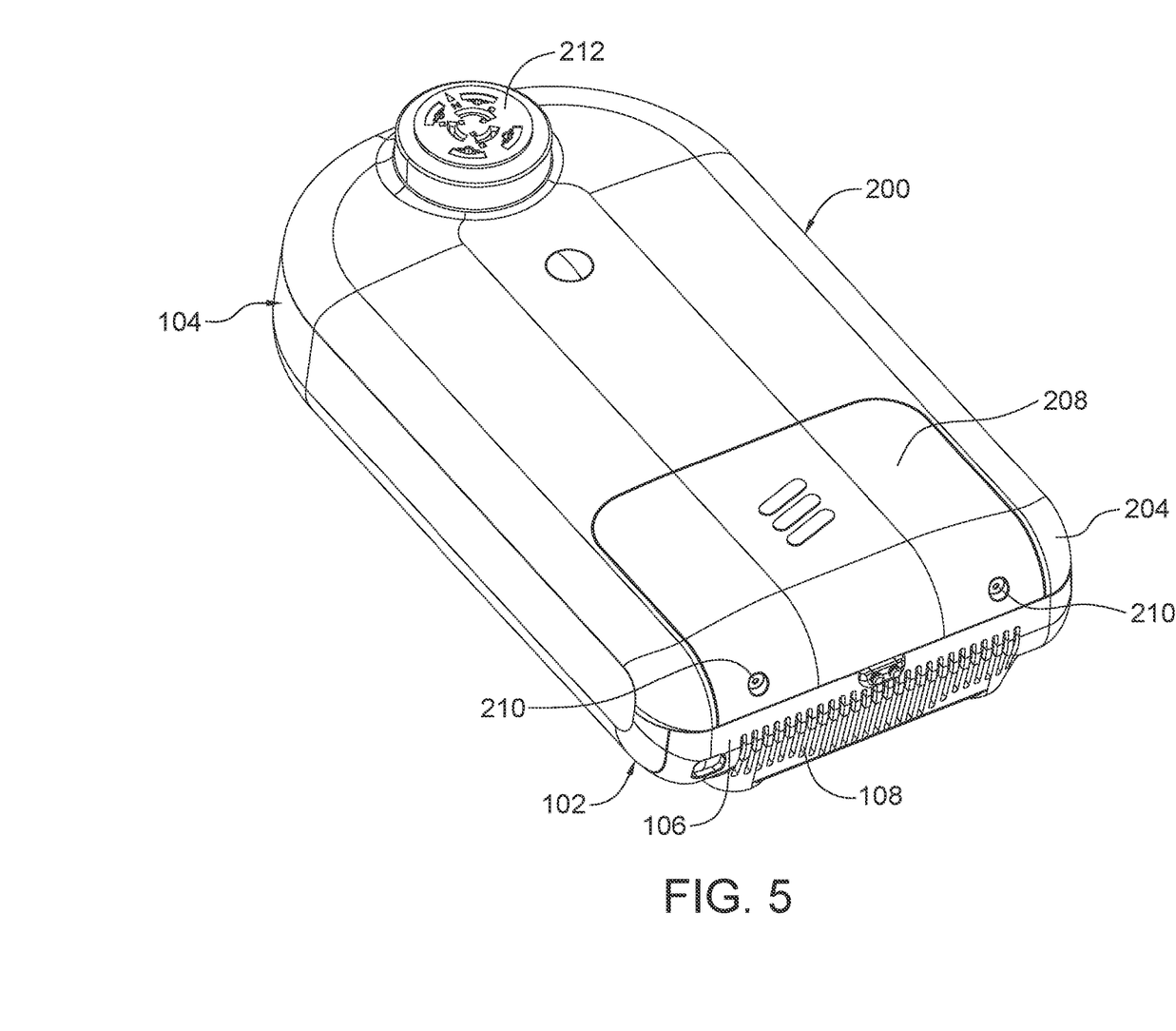
FIG. 5 shows a rear perspective view of an unassembled small cell access node, in accordance with some embodiments of the present disclosure.

FIGS. 3-5 show various views of the housing member in different states. FIG. 3 shows a front perspective view with the lower housing member 102 and sidewall housing member 104 partially assembled. The second exhaust port 130 can be seen at the front 132 of the sidewall housing member 104 as a series of vertical slit openings through the front 132 of the sidewall housing member 104. As will be appreciated, different configurations of the openings or opening to form the second exhaust port 130 can be used. FIG. 4 shows a bottom perspective of the assembled small cell access node in which the vertical electrical connector 138 can be seen in the opening of boss 118 and is configured to provide electrical power to components housed in the housing.

Further, in FIG. 4 both the first exhaust port 128 and the second exhaust port 130 can both be seen. The first exhaust port 128 is in the transition portion 112 of the floor of the lower housing member 102, between the first floor portion and the second floor portion. Also, the undersides 134, 136 of the floor portions can be seen in this view. A pair of slots 402, 404 run in the lengthwise direction of the device and are formed in the first floor portion can provide the walls 120, 122 on the inside of the first floor portion and can provide for mechanical interconnecting to other devices or structures. In FIG. 5, the cover housing member 200 can be seen substantially covering the top of the device. The intake port 108 can be seen at the back wall 106 of the lower housing member 102. Further, the cover housing member 200 can be provided with an access door 208 that can be held in place using, for example, captured screws/bolts 210 that attach to the cover housing member 200 through the access door 208. The access door 208 is also made of a dielectric material. Additionally, the top electrical connector 212 can be provided in the cover housing member. The top electrical connector 212 is a vertically oriented electrical connector, similar to electrical connector 138 at the underside of the device, but which is a female connector that is configured to receive another device, such as, for example, a photometer to provide information about ambient light levels to an light fixture on which the small cell access node is mounted, or to the small cell access node itself to control the light output of a light fixture on which the small cell access node is mounted. The top electrical connector 212 can be positioned directly over the vertical electrical connector 138.

Figure 6:
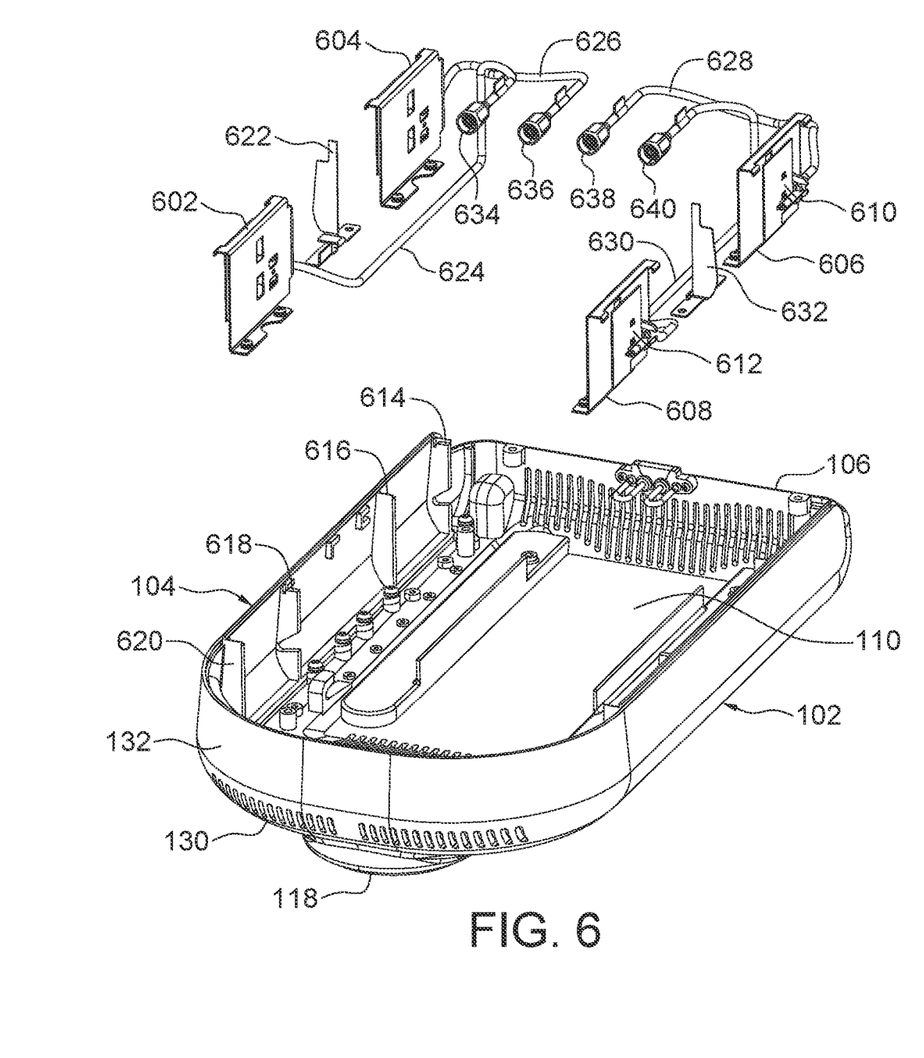
FIG. 6 shows a front perspective view partially assembled housing system for a small cell access node in which planar antennas are assembled, in accordance with some embodiments of the present disclosure.

FIG. 6 shows a front perspective view partially assembled housing system for a small cell access node in which planar antennas are assembled, in accordance with some embodiments of the present disclosure. As in FIGS. 1-5, the lower housing member 102 in conjunction with the sidewall housing member 104, and the back wall 106 of the lower housing member 102, define, generally, a space over the floor portions 110, 114 of the lower housing member 102. The space is bounded at the top by the cover member 200 (not shown here). Along the sidewall housing member 104 within that space there can be one or more antenna elements positioned to transmit and receive radio signals. In the present example, there is shown four planar antenna units including planar antenna brackets 602, 604, 606, 608. The antenna brackets 602, 604, 606, 608 are made of an electrically conductive material and form a vertically oriented, generally planar element having an outward facing surface on which an antenna element is mounted, such as planar antenna elements 610, 612 on antenna brackets 606, 608, respectively. The antenna brackets 602, 604, 606, 608 mount on sidewall features, such as sidewall features 614, 616, 618, 620 which extend from the inner side of the sidewall member 104 into the internal space of the assembly, generally perpendicular to the inner surface of the sidewall member 104. In the present example, antenna bracket 604 is mounted between sidewall features 614, 616 and antenna bracket 602 is mounted between sidewall features 618, 620. Further, between the antenna brackets, on each side of the sidewall housing member 104, there is a conductive blocking member 622, 632. The conductive blocking members 622, 632 are mounted on the conductive lower housing member 102 such that there is an electrical connection, and act to reduce signal interference between antenna members mounted on the antenna brackets on either side of the sidewall housing member 104. Each antenna element 610, 612 is connected to a respective antenna cable 624, 626, 628, 630. Each of the antenna cables 624, 626, 628, 630 are terminated with a connector 634, 636, 68, 640. The antenna cables 624, 626, 628, 630 can be typical coaxial shielded cables that have a conductive core and a shielding element surrounding the core as is well known. It is important to note that the antenna elements are located inside the housing assembly. This is possible because the sidewall housing member 104 is made of a dielectric material that allows radio waves to pass through the sidewall housing member 104. By mounting the antenna elements inside the housing assembly, there is no need for externally mounted antennas, which can detract from the aesthetics of the assembly.

Figure 7:
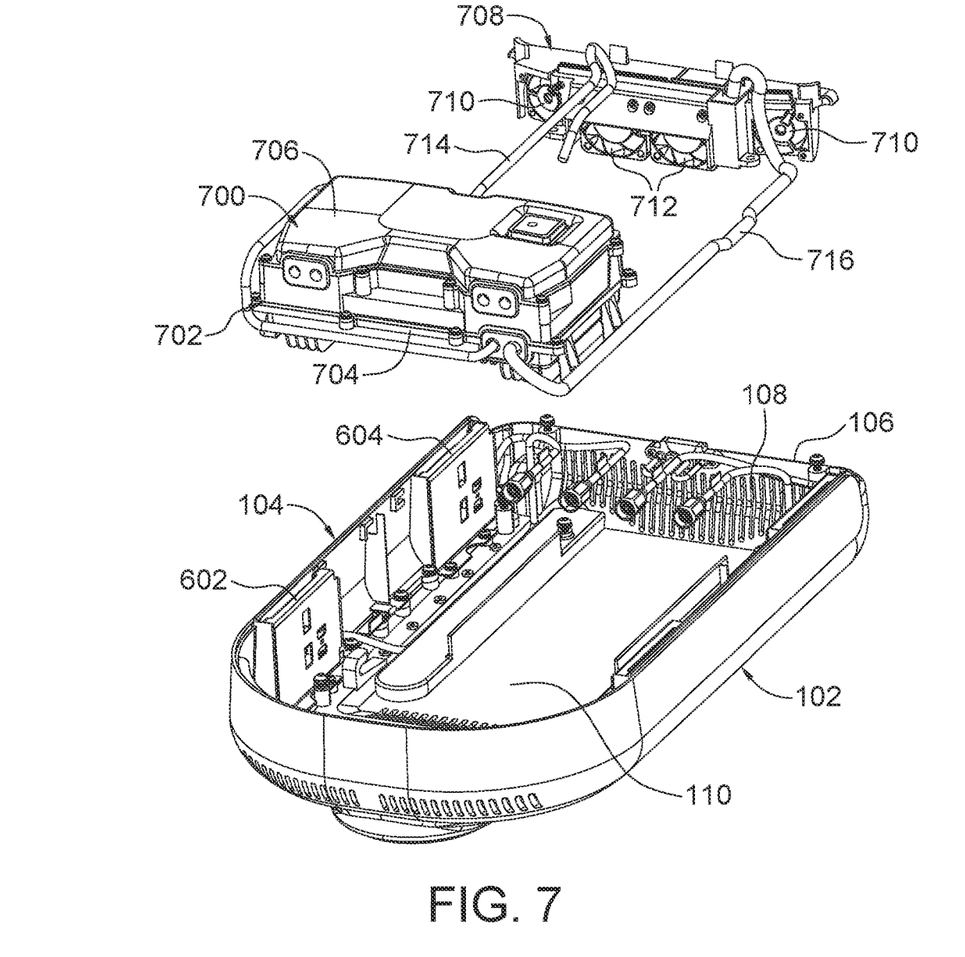
FIG. 7 shows a front perspective view partially assembled housing system for a small cell access node as shown in FIG. 6 and in which a control and power electrical module is additionally assembled, in accordance with some embodiments of the present disclosure.

FIG. 7 shows a front perspective view partially assembled housing system for a small cell access node as shown in FIG. 6 and in which a control and power electrical module is additionally assembled, in accordance with some embodiments of the present disclosure. Further, in this view, the antenna brackets 602, 604 are shown assembled in the housing assembly. In this view, an electrical module 700, shown disposed over a portion of the floor portions 110, 114, includes a shielded enclosure formed from a central shielding member 702, a bottom shielding member 704, and a top shielding member 706. Two internal volumes are created by the shielding members 702, 704, 706. The first internal volume is formed between the central shielding member 702 and the top shielding member 706, and a second internal volume is formed between the central shielding member 702 and the bottom shielding member 704. In each of these internal volumes there are disposed different perspective circuits. A control circuit can be housed in the first internal volume between the central shielding member 702 and the top shielding member 706, and a power supply circuit can be housed in the second internal volume between the central shielding member 702 and the bottom shielding member 704. Each of the shielding members 702, 704, 706 provide sidewall portions that extend completely around the module, and the shielding members 702, 704, 706 are made of an electrically conductive material to block emission of signals or noise, as well as to prevent unwanted ingress of noise. The bottom shielding member 704 is mounted on and fastened to the floor portions 110, 114 of the lower housing member 102 such that an electrical connection is made. Likewise, the is also an electrical connection (e.g., a DC connection) between the bottom shielding member 704 and the central shielding member 702 and the top shielding member 706. Further, the central shielding member 702 provides a horizontal conductive floor or separator between the two internal volumes of the module 700, and the top shielding member 706 provides a horizontal cover over the first internal volume while the bottom shielding member 704 provides a bottom cover under the second internal volume of the module 700. Thus, the control circuit and the power supply circuit are arranged in a vertically stacked relationship. In some embodiments there can be a passage between the first and second internal volumes to allow connection of the control circuit with the power supply circuit.

Figure 8:
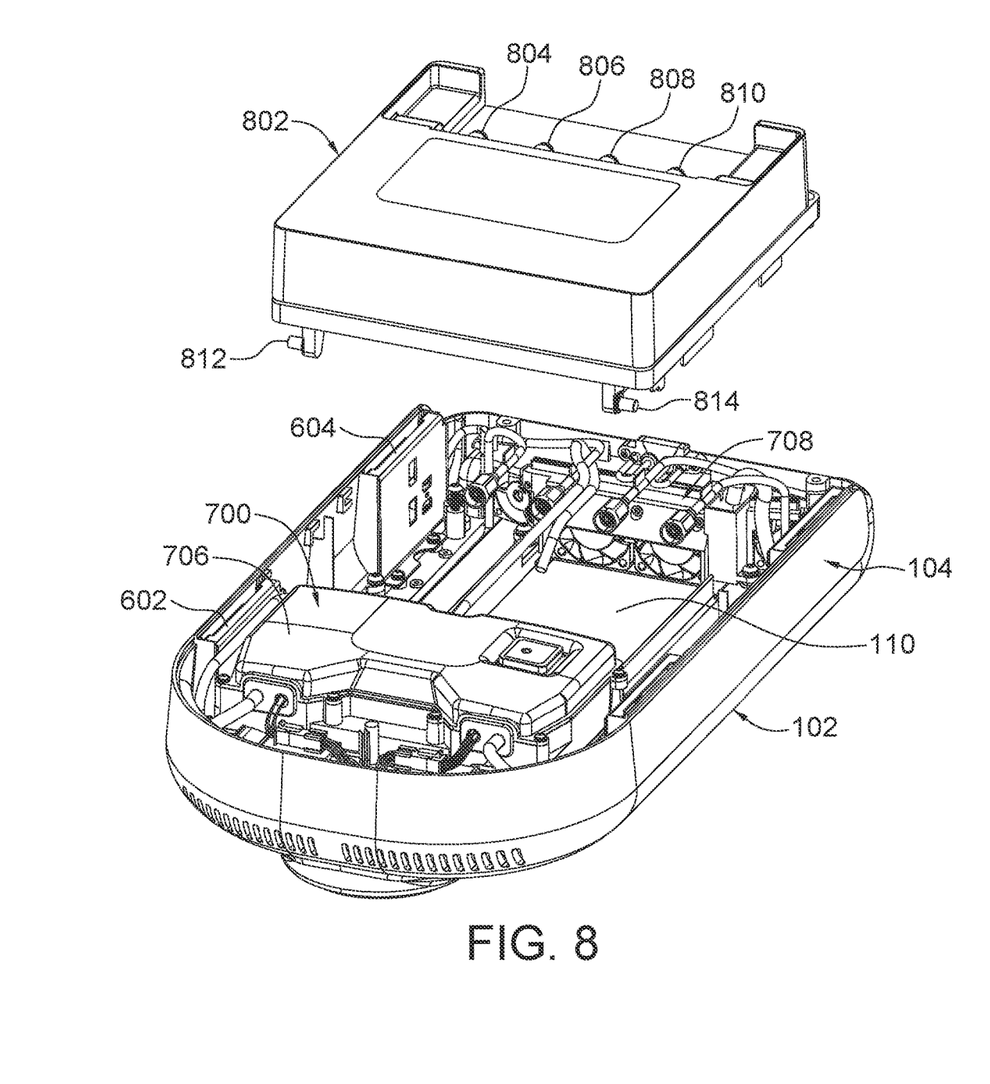
FIG. 8 shows a front perspective view partially assembled housing system for a small cell access node as shown in FIG. 7 and in which a radio module is additionally assembled, in accordance with some embodiments of the present disclosure.

Also shown is a fan unit 708 that includes one or more fans and is located near the rear air intake grate 108 of the rear wall 106 of the lower housing member 102. The fan unit 708, as shown here, includes two outer fans 710 and two inner fans 712. The outer fans 710 are positioned and oriented to blow air along the sides of the housing assembly while the inner fans 712 are positioned to blow air under the electrical module(s) housed inside the housing assembly. The fan unit 708 receives power via a fan power cable 716 from the power supply circuit in front electrical module 700. A radio power cable 714 is also shown that provides power to the radio module (not shown here). Both the fan power cable 716 and the radio power cable 714 can be shielded to reduce unwanted noise intrusion or transmission into or from the cables 714, 716. FIG. 8 shows a front perspective view partially assembled housing system for a small cell access node as shown in FIG. 7 and in which a radio module 802 is additionally assembled, in accordance with some embodiments of the present disclosure. In addition to the front electrical module 700, the housing assembly can further include a radio module 802. The radio module includes radio circuitry for wireless communications as a small cell device, including communicating locally with mobile devices, and relaying signals between mobile devices and a terrestrial communications infrastructure for voice and data communications. The radio module 802 includes a plurality of antenna connectors 804, 806, 808, 810 that are used to connect to connectors 634, 636, 638, 640 and thereby to the antenna elements on antenna brackets 602, 604, 606, 608. This arrangement allows the radio module to operate according to a multiple in, multiple out (MIMO) radio interface configuration. The radio power cable 714 provides power to the radio module, and inner fans 712 blow air over fins on the bottom of the radio module 802. The radio module 802 sits between the electrical module 702 and the fan unit 708 over the floor portions 110, 114 of the lower housing member 102. At the bottom of the front side of the radio module 802 are a pair of opposing mounting rods 812, 814. The mounting rods 812, 814 are horizontally oriented with one at each of the lower front corners, along a coaxial axis, and are configured to fit into receiving hooks 142, 140, respectively, on the floor portions 110, 114 of the lower housing member 102. This allows the radio module to be inserted into, or removed from, the assembled housing assembly through door 208. The radio module 802 includes a conductive housing that provides radio shielding, and which can be fastened to the floor portions 110, 114 in addition to engagement of the mounting rods 812, 814 with receiving hooks 140, 142. When the mounting rods 812, 814 are engaged in the receiving hooks 140, 142 then other fastener locations on the radio module 802 will be aligned with fastener bosses on the floor portions 110, 114 of the lower housing member 102.

Figure 9:
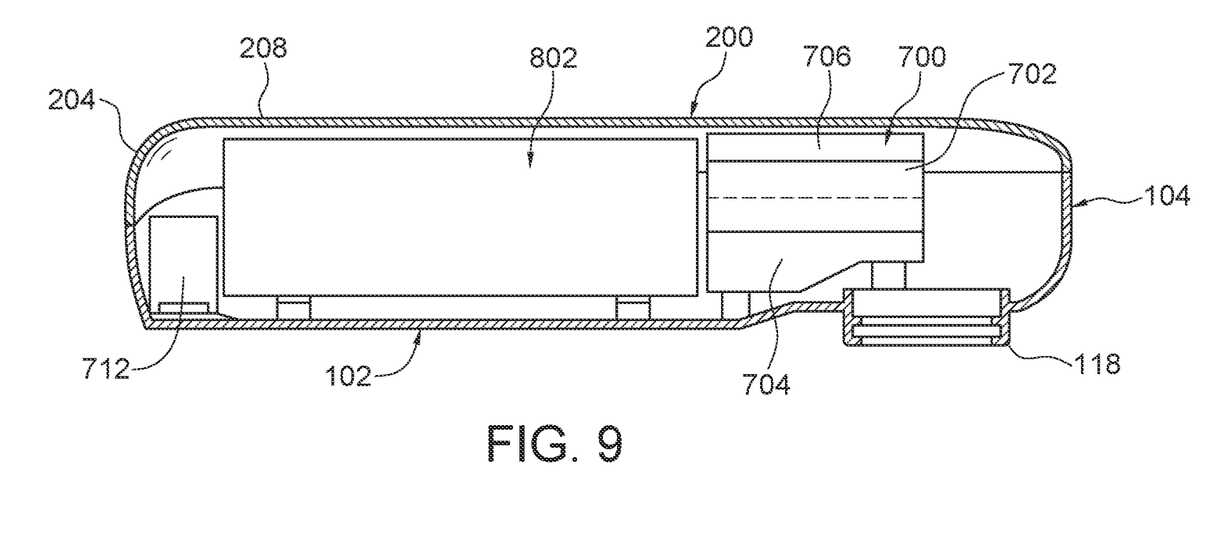
FIG. 9 shows a partial side cutaway view of an assembled small cell access node, in accordance with some embodiment of the present disclosure.

FIG. 9 shows a partial side cutaway view of an assembled small cell access node, in accordance with some embodiment of the present disclosure. In the present view of FIG. 9, the lower housing member 102, sidewall housing member 104, cover housing member 200 and door 208 are sectioned along a line through the middle of the assembly in a direction from the front to the back of the assembly. The interior components are represented positionally, and not necessarily cross sectioned. As used herein, the front of the device is on the right side, and the rear or back of the device is on the left side of the drawing. Inside the housing members 102, 104, 200 the electrical module 700 is housed, and includes the top shielding member 706, the central shielding member 702, and the bottom shielding member 704. The electrical module 700 is disposed over a portion of the floor of the lower housing member 102 that is raised or elevated with respect to the more rearward section of the that is occupied by the radio module 802. Both the electrical module 700 and radio module 802 are fastened to the lower housing member 102. Note that other elements such as, for example, the antenna brackets, are not shown in this view, but such elements as shown in the preceding drawings would be present in the assembled and operational device.

Figure 10:
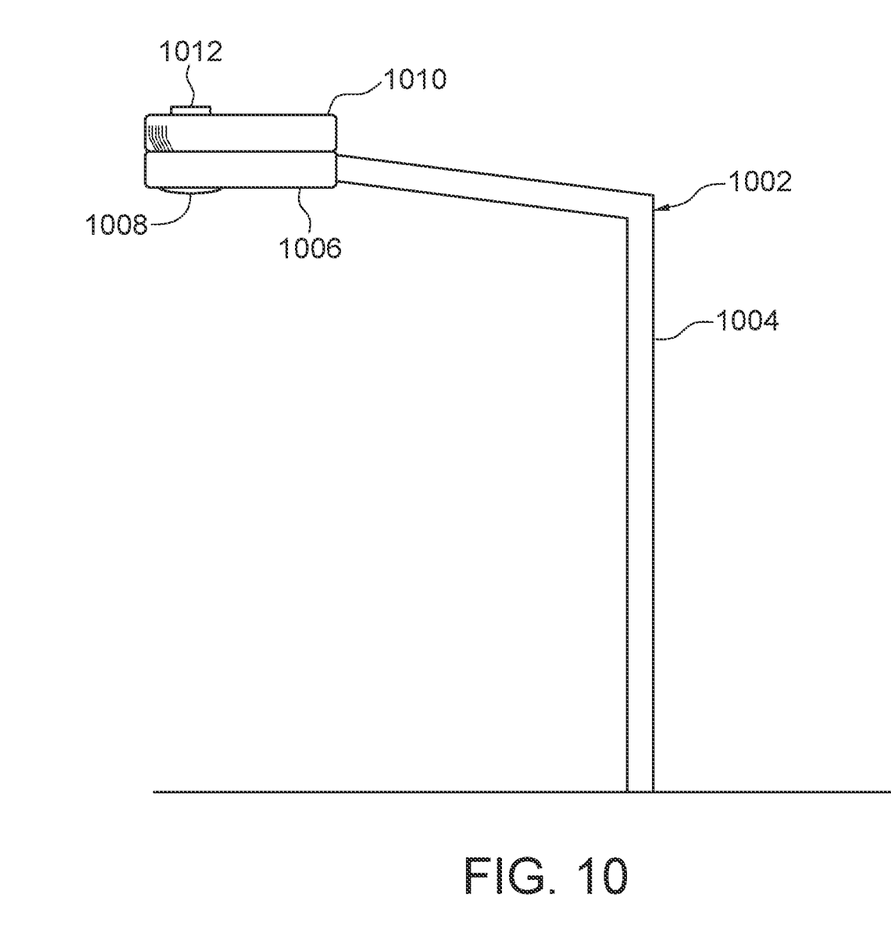
FIG. 10 shows a small cell access node mounted on a streetlight, in accordance with some embodiments.

FIG. 10 shows a small cell access node 1010 mounted on a streetlight 1002, in accordance with some embodiments. The streetlight 1002 includes a mast 1004 and a light element 1006 or luminaire. The mast 1004 can include a ground-mounted pole that generally extends upward from the ground and then extends outward over the ground/street. The light element 1006 includes circuitry and a lamp 1008 that emits light downward towards the ground below. In some embodiments, the mast 1004 can extend from a structure (e.g., a bridge or building) rather than being mounted in the ground. The light element 1006 includes, on its top side, an electrical connector. The small cell access node 1010 is mounted on top of the light element 1006 and is configured and assembled substantially as shown in the preceding drawings. Thus, an electrical connector of the small cell access node 1010, such as electrical connector 138, can mate with the electrical connector on the top of the light element 1006. The small cell access node 1010 can itself include an electrical connector such as connector 212 on its cover/top. The materials used in the constructing the small cell access node 1010 help minimize its weight and volume, which are important when mounting on the light element 1006 because the mounting of the light element 1006 on the mast 1004 must meet specified loading requirements.

The foregoing disclosure has described embodiments of a small cell access node housing assembly. The assembly utilizes an electrically conductive lower housing member that provides sufficient rigidity and strength to support the assembly and the components contained within the housing assembly. Being conductive, the lower housing member also provides a shielding benefit for electromagnetic noise. By making the remaining portions of the housing assembly out of non-conductive materials, the weight of the assembly is minimized, and the antenna elements can be housing inside the assembly, rather than the being externally mounted, which can enhance the aesthetic appeal of the small cell access node.

The claims appended hereto are meant to cover all modifications and changes within the scope and spirit of the present invention.

What is claimed is:

1. A small cell access node comprising:
   a housing including:
      an electrically conductive lower housing member having a floor portion; and
      an electrically non-conductive sidewall housing member secured along a first edge thereof around at least part of a periphery of the floor portion of the lower housing member;
   at least one electrical module positioned in a volume defined by at least the lower housing member and the sidewall housing member, the at least one electrical module including a shielded enclosure, the shielded enclosure being electrically coupled to the lower housing member; and
   an electrical interface connector passing through the lower housing member, the electrical interface connector being operable to receive electrical power from an external power source and provide the electrical power to the at least one electrical module.

2. The small cell access node of claim 1, further comprising:
   an electrically non-conductive cover secured to the sidewall housing member along a second edge thereof.

3. The small cell access node of claim 2, further comprising:
   a second electrical interface connector passing through the cover, the second electrical interface connector being operable to supply electrical power received from the external power source to an external device electrically connected to the second electrical connector.

4. The small cell access node of claim 2, wherein the cover includes an access door.

5. The small cell access node of claim 1, wherein the at least one electrical module includes:
   a radio module positioned over a first section of the floor portion of the lower housing member;
   a power supply module; and
   a control module;
   wherein the control module and the power supply module are configured in a stacked arrangement and positioned over a second section of the floor portion of the lower housing member.

6. The small cell access node of claim 5, further comprising:
   at least one antenna mounted between the sidewall housing member and the at least one electrical module, wherein a transceiver of the radio module is electrically coupled to the at least one antenna.

7. The small cell access node of claim 6, wherein the at least one antenna includes a first antenna positioned on a first side of the at least one electrical module and a second antenna positioned on a second side of the at least one electrical module, the second side of the at least one electrical module being opposite the first side of the at least one electrical module.

8. The small cell access node of claim 1, wherein the volume defined by at least the lower housing member and the sidewall housing member is in a range of about 5000 cubic centimeters to about 9000 cubic centimeters.

9. The small cell access node of claim 1, wherein the lower housing member and the shielded enclosure of the at least electrical module are electrically grounded.

10. A small cell access node comprising:
    an electrically conductive lower housing member having a floor portion and a sidewall portion, the sidewall portion being connected to the floor portion at one lengthwise end of the floor portion;
    an electrically non-conductive, generally U-shaped sidewall housing member secured to the floor portion and the sidewall portion of the lower housing member;
    at least one electrical module positioned over the floor portion of the lower housing member, the at least one electrical module being housed in at least one shielded enclosure that is electrically coupled to the floor portion of the lower housing member; and
    an electrically non-conductive cover secured to the sidewall housing member and the sidewall portion of the lower housing member.

11. The small cell access node of claim 10, further comprising:
    an electrical interface connector passing through the lower housing member, the electrical interface connector being operable to receive electrical power from an external power source and provide the electrical power to the at least one electrical module.

12. The small cell access node of claim 10, wherein the at least one electrical module comprises:
    a radio module housed in a first shielded enclosure of the at least one shielded enclosure and positioned over a first section of the floor portion of the lower housing member;
    a power supply module;
    a control module configured in a stacked arrangement with the power supply module and positioned over a second section of the floor portion of the lower housing member, the stacked arrangement of the power supply module and the control module being housed in a second, shared shielded enclosure of the at least one shielded enclosure; and
    a shielded power cable connecting the power supply module to the radio module, wherein shielding of the shielded power cable is electrically connected to the first shielded enclosure and the second shielded enclosure.

13. The small cell access node of claim 12, further comprising:
    at least two antenna elements separately coupled to the radio module, the at least two antenna elements including:
    a first antenna element positioned on a first side of the radio module between the radio module and the sidewall housing member; and
    a second antenna element positioned on a second side of the radio module between the radio module and the sidewall housing member, the second side of the radio module being opposite the first side of the radio module.

14. The small cell access node of claim 10, wherein the at least one electrical module is coupled directly to the floor portion of the lower housing member at a plurality of interface points, each interface point of the plurality of interface points constituting a zero ohm, direct current coupling.

15. The small cell access node of claim 10, wherein electrical coupling of the at least one shielded enclosure to the floor portion of the lower housing member is direct or capacitive.

16. A small cell access node comprising:
    an electrically conductive lower housing member having a floor portion and a sidewall portion, the sidewall portion being connected to the floor portion at one lengthwise end of the floor portion;
    an electrically non-conductive, generally U-shaped sidewall housing member secured to the floor portion and the sidewall portion of the lower housing member, wherein the sidewall housing member and the lower housing member at least partially define a volume;
    at least one electrical module positioned within the volume and over the floor portion of the lower housing member, the at least one electrical module being housed in at least one shielded enclosure that is electrically coupled to the floor portion of the lower housing member;
    at least one antenna mounted within the volume and coupled to the at least one electrical module via an antenna cable; and
    an electrically non-conductive cover secured to the sidewall housing member and the sidewall portion of the lower housing member.

17. The small cell access node of claim 16, further comprising:
    an electrical interface connector passing through the lower housing member, the electrical interface connector being operable to receive electrical power from an external power source and provide the electrical power to the at least one electrical module.

18. The small cell access node of claim 16, wherein the at least one electrical module comprises:
    a radio module housed in a first shielded enclosure of the at least one shielded enclosure and positioned over a first section of the floor portion of the lower housing member;

a power supply module;

a control module configured in a stacked arrangement with the power supply module and positioned over a second section of the floor portion of the lower housing member, the stacked arrangement of the power supply module and the control module being housed in a second, shared shielded enclosure of the at least one shielded enclosure; and a shielded power cable connecting the power supply module to the radio module, wherein shielding of the shielded power cable is electrically connected to the first shielded enclosure and the second shielded enclosure.

19. The small cell access node of claim 18, further comprising:

at least two antenna elements separately coupled to the radio module, the at least two antenna elements including:

a first antenna element positioned on a first side of the radio module between the radio module and the sidewall housing member; and a second antenna element positioned on a second side of the radio module between the radio module and the sidewall housing member, the second side of the radio module being opposite the first side of the radio module.

20. The small cell access node of claim 16, wherein the at least one electrical module is coupled directly to the floor portion of the lower housing member at a plurality of interface points, each interface point of the plurality of interface points constituting a zero ohm, direct current coupling.

* * * * *